(12) United States Patent  
Xu et al.

(10) Patent No.: US 9,326,255 B2  
(45) Date of Patent: Apr. 26, 2016

(54) METHOD, APPARATUS AND SYSTEM FOR INTERFERENCE MANAGEMENT

(71) Applicant: Huawei Technologies Co., Ltd., Shenzhen, Guangdong (CN)

(72) Inventors: Min Xu, Shenzhen (CN); Dong Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 14/031,864

(22) Filed: Sep. 19, 2013

(65) Prior Publication Data

US 2014/0018119 A1    Jan. 16, 2014

Related U.S. Application Data

(63) Continuation of application No. PCT/CN2012/070846, filed on Feb. 2, 2012.

(30) Foreign Application Priority Data

Mar. 21, 2011 (CN) .......................... 2011 1 0067486

(51) Int. Cl.  
*H04W 52/24* (2009.01)  
*H04W 84/04* (2009.01)  
*H04W 52/14* (2009.01)

(52) U.S. Cl.  
CPC .......... *H04W 52/244* (2013.01); *H04W 52/143* (2013.01); *H04W 84/045* (2013.01)

(58) Field of Classification Search  
CPC ............ H04W 52/143; H04W 52/244; H04W 84/045  
See application file for complete search history.

(56) References Cited

U.S. PATENT DOCUMENTS

2010/0246482 A1    9/2010  Erceg et al.  
2011/0105132 A1*   5/2011  Vasudevan ............ H04W 48/16  
                                                          455/448

(Continued)

FOREIGN PATENT DOCUMENTS

CN    101697628 A    4/2010  
CN    101778463 A    7/2010

(Continued)

OTHER PUBLICATIONS

"3GPP TS 25.367—3$^{rd}$ Generation Partnership Project; Technical Specification Group Radio Access Network; Mobility procedures for Home Node B (HNB); Overall description; Stage 2 (Release 9)," Version 9.5.0, 3$^{rd}$ Generation Partnership Project, Valbonne, France (Dec. 2010).

(Continued)

*Primary Examiner* — Fanghwa Wang  
(74) *Attorney, Agent, or Firm* — Leydig, Voit & Mayer, Ltd.

(57) ABSTRACT

Disclosed in the present invention are a method, an apparatus and a system for interference management. In the embodiments of the present invention, a Home NodeB (HNB) registers in a macro cell in advance, so that a NodeB Controller (NBC) knows the information of a potential interference source HNB beforehand. Thus simply through a normal measurement and a report subsequently performed by a terminal, an interference source HNB can be found easily, and an interference management of the interference source HNB also can be performed. The solution can avoid the situation in the prior art that the interference management is performed necessarily with a cell identity of the interference source HNB obtained by the terminal. With the application of the solution, the interference management to the HNB can be performed timely and effectively and the interference experienced by the terminal from the HNB is reduced.

19 Claims, 8 Drawing Sheets

(56) References Cited

U.S. PATENT DOCUMENTS

| | | | |
|---|---|---|---|
| 2011/0130138 A1* | 6/2011 | Lee | H04W 60/00 455/435.1 |
| 2011/0171915 A1* | 7/2011 | Gomes | H04W 24/10 455/73 |
| 2012/0231833 A1* | 9/2012 | Kolding | H04W 52/243 455/522 |

FOREIGN PATENT DOCUMENTS

| | | |
|---|---|---|
| CN | 101895924 A | 11/2010 |
| CN | 101902788 A | 12/2010 |
| CN | 101902788 A | 12/2012 |
| WO | WO 2011004169 A1 | 1/2011 |

OTHER PUBLICATIONS

"3GPP TS 25.467—3$^{rd}$ Generation Partnership Project; Technical Specification Group Radio Access Network; UTRAN architecture for 3G Home Node B (HNB); Stage 2 (Release 10)," Version 10.0.0, 3$^{rd}$ Generation Partnership Project, Valbonne, France (Dec. 2010).

International Search Report in corresponding PCT Patent Application No. PCT/CN2012/070846 (May 10, 2012).

* cited by examiner

US 9,326,255 B2

METHOD, APPARATUS AND SYSTEM FOR INTERFERENCE MANAGEMENT

CROSS-REFERENCE TO RELATED APPLICATIONS

This application is a continuation of International Patent Application No. PCT/CN2012/070846, filed on Feb. 2, 2012, which claims priority to Chinese Patent Application No. 201110067486.7, filed on Mar. 21, 2011, both of which are hereby incorporated by reference in their entireties.

TECHNICAL FIELD

The present invention relates to the field of communication technology, and specifically, to a method, an apparatus and a system for interference management.

BACKGROUND

With the development of mobile communication technology, the users' requirements are increasingly diversified. In order to meet the users' diversified requirements, private networks, such as the Home NodeB (HNB), emerge at the right moment, wherein the HNB is also referred to as a Femtocell NodeB.

There are three different access modes for the HNB: a closed mode, a hybrid mode and an open mode. The closed mode only allows a subscriber to access the cell. The hybrid mode allows all the users to access the cell, but the subscribers and non-subscribers are distinguished and then provided with different access levels and service levels. The open mode is similar to the macro cell and allows all the users to access.

As compared with the conventional macro cell, the HNB has the characteristics such as a small coverage range, a limited number of the carried users, a large quantity, an intensive deployment and a multi-layer overlap coverage. In addition, since the HNB is managed by the user rather than being an equipment controlled by the operator, it is inconvenient to perform a uniform management of the whole network. When the HNB and the macro cell use the same frequency for networking, the same frequency interference will be caused, including mutual uplink and downlink interferences between the macro cell and the HNB, due to the overlap of the network coverage of the macro cell and the HNB. Particularly, when a terminal having no right to access the HNB (i.e., a non-subscriber) approaches the HNB, the communication of the terminal will be interfered with by the strong signal of the HNB, and even a dropped call will occur. Thus, the prior art proposes to perform an interference management between the macro cell and the HNB, so as to reduce the interference to the terminal. The details are introduced as follows.

When approaching HNBs, the terminal reads a system message of an interference source HNB to acquire a cell identity of the interference source HNB, and then reports the cell identity of the interference source HNB to a Radio Network Controller (RNC) of the macro cell. The RNC finds a target HNB according to the cell identity, and notifies the HNB to adjust the transmit power, so as to reduce the interference to the terminal.

In the study and practice of the prior art, the inventor of the present invention finds that due to some factors, e.g., same frequency interference or being not supported by the capability of the terminal, the terminal cannot receive the system message of the interference source HNB (i.e., cannot acquire the cell identity of the interference source HNB), and thus cannot subsequently perform an interference management between the macro cell and the HNB, resulting in a service interruption occurring at the terminal. In addition, a certain time is spent by the terminal in reading the system message, which may also prevent the interference management from being timely carried out, and causes a drop call at the terminal.

SUMMARY

The embodiments of the present invention provide a method, an apparatus and a system for interference management, which can timely and effectively perform an interference management of the HNB, and reduce the interference experienced by the terminal from the HNB.

An aspect of the present invention provides A method for interference management, comprising: receiving from a Home NodeB (HNB) a register request carrying register information; positioning the HNB according to the register information, and returning to the HNB a register response indicating that the registration is successful; receiving measurement information related to the HNB reported by a terminal; determining an interference source HNB of the terminal according to the register information and the measurement information; and performing power adjustment on the interference source HNB.

Another aspect of the present invention provides A method for interference management, comprising: sending a register request carrying register information to a NodeB Controller (NBC); receiving from the NBC a register response indicating that the registration is successful; and accepting a power adjustment made by the NBC when a Home NodeB (HNB) is determined as an interference source HNB.

Another aspect of the present invention provides a NodeB Controller (NBC), comprising: a register information receiving unit configured to receive from a Home NodeB (HNB) a register request carrying register information; a registering unit configured to position the HNB according to the information received by the register information receiving unit, and return to the HNB a register response indicating that the registration is successful; a measurement information receiving unit configured to receive measurement information related to the HNB reported by a terminal; a determining unit configured to determine an interference source HNB of the terminal according to the register information and the measurement information; and an adjusting unit configured to perform power adjustment on the interference source HNB determined by the determining unit.

Another aspect of the present invention provides a Home NodeB (HNB), comprising: a sending unit configured to send to a NodeB Controller (NBC) of a register request, wherein the register request carries register information; a receiving unit configured to receive from the NBC a register response indicating that the registration is successful; and an adjusting unit configured to accept a power adjustment made by the NBC when the HNB is determined as an interference source HNB.

Another aspect of the present invention provides a communication system, comprising any of the NBCs and any of the HNBs provided by the embodiments of the present invention.

The embodiments of the present invention avoid the situation in the prior art that the interference management is performed necessarily with a cell identity of the interference source HNB obtained by the terminal (i.e., a system message is received from the interference source HNB). With the application of the solution, the interference management to the HNB can be performed timely and effectively and the interference experienced by the terminal from the HNB is reduced.

BRIEF DESCRIPTION OF DRAWINGS

In order to more clearly describe the technical solutions in the embodiments of the present invention, the drawings to be used in the descriptions of the embodiments are briefly introduced as follows. Obviously, the following drawings just illustrate some embodiments of the present invention, and a person skilled in the art can obtain other drawings from these drawings without paying any creative effort.

DESCRIPTION OF EMBODIMENTS

The technical solutions in the embodiments of the present invention will be clearly and completely described as follows with reference to the drawings in the embodiments of the present invention. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

The embodiments of the present invention provide a method, an apparatus and a system for interference management, which are applicable to various communication systems, such as Global System for Mobile Communications (GSM), Code Division Multiple Access (CDMA) system, Wideband Code Division Multiple Access Wireless (WCDMA), General Packet Radio Service (GPRS), and Long Term Evolution (LTE), etc. Herein a detailed description is made by taking the WCDMA as an example.

A method embodiment of the method for interference management provided by the embodiment of the present invention is described as follows.

The embodiment is described in the perspective of an NBC of the macro cell, and the NBC specifically may be a network apparatus such as the RNC.

A method for interference management comprises: receiving from an HNB a register request carrying register information; positioning the HNB according to the register information, and returning to the HNB a register response indicating that the registration is successful; receiving measurement information related to the HNB reported by a terminal; determining an interference source HNB of the terminal according to the register information and the measurement information; and performing power adjustment on the determined interference source HNB.

Figure 1:
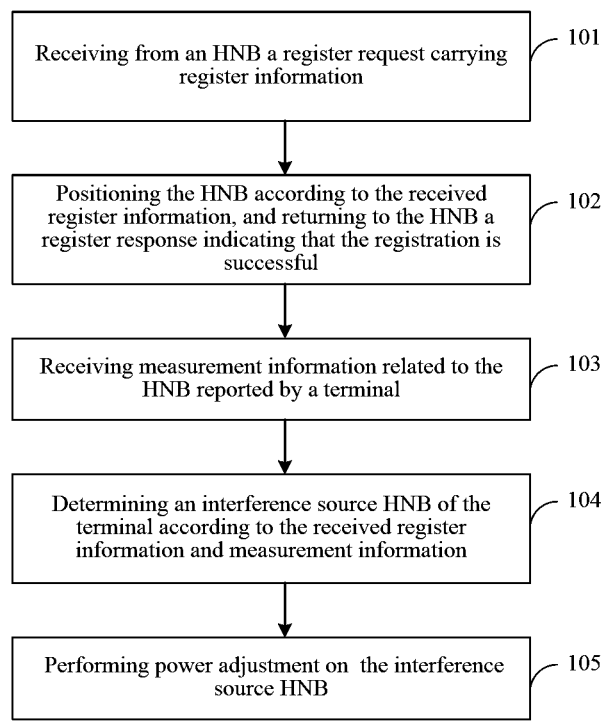
FIG. 1 is a flowchart of A method for interference management according to an embodiment of the present invention.

Referring to FIG. 1, the flows of A method for interference management may be specifically described as follows.

101: receiving from an HNB a register request, wherein the register request carries register information.

In which, the register information may include the basic information of the HNB and other information.

For example, the basic information of the HNB may include the Primary Scrambling Code (PSC) of the HNB, and/or the transmit power of the HNB, and/or the access mode, and/or the access control list, etc.

For example, other information of the HNB may include the quality of the macro cell signal received by the HNB, and/or the path loss from the HNB to the macro cell, and/or the quality of other neighbor cell signal received by the HNB, and/or the time difference information between the HNB and the macro cell, and/or the location information of the HNB. In which, the location information may specifically be various positioning information, such as the Global Positioning System (GPS) positioning information.

102: positioning (i.e., registering) the HNB according to the received register information, and returning to the HNB a register response indicating that the registration is successful.

In which, the positioning the HNB according to the received register information may specifically be as follows.

For example, the HNB may be positioned according to the path loss from the macro cell to the HNB, the PSC of the HNB, and the quality of other neighbor cell signal received by the HNB; or the HNB may be positioned according to the PSC of the HNB and the quality of other neighbor cell signal received by the HNB; or the HNB may be positioned according to the path loss from the macro cell to the HNB and the PSC of the HNB. For example, a path loss may be calculated according to the transmit power of the macro cell and the quality of the macro cell signal received by the HNB, and then the HNB is positioned according to the path loss, the PSC of the HNB, and the quality of other neighbor cell signal received by the HNB. Or, for another example, the HNB may be positioned according to the PSC of the HNB and the quality of other neighbor cell signal received by the HNB. Or, for another example, the HNB may be positioned according to the path loss from the macro cell to the HNB and the PSC of the HNB. Or, for another example, the HNB may be positioned according to the PSC of the HNB and the time difference information between the HNB and the macro cell. Or, for another example, the HNB may be positioned according to the PSC of the HNB and the location information of the HNB. Or, for another example, the HNB may also be positioned according to the location information of the HNB, such as the GPS positioning information of the HNB.

Optionally, in that case, the NBC may determine whether there is any interference to the macro cell according to the transmit power of the HNB, and if there is, the transmit power of the HNB may be adjusted, i.e., the method for interference management may further include: adjusting the transmit power of the HNB when determining that the HNB interferes with the macro cell.

Specifically, the adjustment may be made by sending an individual power adjustment signaling to the HNB, or directly adjusting the HNB through a register response carrying power adjustment information. In which, the directly adjusting the HNB through the register response can save the signaling process as compared with the sending the individual power adjustment signaling to the HNB. In which, the power adjustment signaling or the power adjustment information may include adjustable range, and/or adjustment magnitude, and/or time information, etc. of the power, wherein the time information may include start time and/or recovery time of the power adjustment, etc.

In addition, optionally, when the register information of the HNB such as the basic information or the signal quality is changed, the NBC may be notified through an update request, i.e., the method for interference management may further include: the NBC receives from the HNB an update request, wherein the update request carries updated register information.

103: receiving measurement information related to the HNB reported by a terminal.

In which, the measurement information may include the measured PSC of the HNB, and/or the measured signal quality, and/or the measured time difference information between the HNB and the macro cell, and/or the measured location information of the HNB, wherein the location information may specifically be various positioning information, such as the GPS positioning information.

To be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information generally may be set as a subset of the register information. For example, when the register information includes the transmit power of the HNB, the PSC of the HNB, the access mode, the access control list and the signal quality, the measurement information that needs to be reported by the terminal may include the measured PSC of the HNB and the signal quality. For another example, when the register information includes the location information of the HNB, the measurement information that needs to be reported by the terminal may specifically be the measured location information of the HNB.

104: determining an interference source HNB of the terminal according to the register information and the measurement information.

For example, the PSC of the HNB, and/or the time difference information between the HNB and the macro cell, and/or the location information of the HNB, and/or the quality of the macro cell signal received by the HNB in the register information is/are matched with the measured PSC of the HNB, and/or the measured time difference information between the HNB and the macro cell, and/or the measured location information of the HNB, and/or the measured signal quality in the measurement information; and when they are matched with each other, it is determined that the HNB is an HNB corresponding to the measurement information reported by the terminal (i.e., the HNB measured by the terminal), and herein referred to as a target HNB.

For example, the target HNB is determined as an interference source HNB when it is determined, according to the access mode and/or the access control list of the target HNB, that the terminal cannot access the target HNB. Or, the target HNB is determined as an interference source HNB when it is determined, according to the access mode in the register information, that the access mode of the target HNB is a closed mode, the target HNB is not in a neighbor cell list of the macro cell, and the terminal does not support the Closed Subscriber Group (CSG).

When it is determined that the target HNB is not the interference source HNB, the subsequent power adjusting step (i.e., step 105) is not performed.

In which, the interference source HNB refers to an HNB interfering with the terminal. The interference source HNB is also the target HNB which needs a power adjustment in the embodiment of the present invention.

105: adjusting the power of the interference source HNB determined in step 104, so as to reduce the interference to the terminal from the HNB.

For example, an air interface signaling carrying power control information may be sent to the HNB, or a power adjustment signaling may be sent to the HNB.

In which, the power control information or the power adjustment signaling may include adjustable range of the power, adjustment magnitude, and/or time information, wherein the time information may include start time and/or recovery time of the power adjustment, etc.

The adjustable range of the power refers to the maximum adjustable range of the power, the adjustment magnitude refers to the magnitude of the power adjusted each time, the start time refers to the time at which the HNB starts adjusting the power, and the recovery time refers to the time at which the HNB recovers the present power to the original power.

For example, the adjusting method specifically may be as follows:

After receiving a power adjustment signaling sent by the NBC (e.g., RNC), the HNB decreases the transmit power according to a preset policy negotiated by the NBC and the HNB, or the adjustment information in the power control signaling. For example, the transmit power may be decreased stepwise, i.e., each time a power adjustment signaling is received, the transmit power is decreased by a (dBm) and the timer T1 is started. If a power adjustment signaling is received again before the timer T1 expires, the transmit power is further decreased by a (dBm) and the timer T1 is restarted, while if no power adjustment signaling is received when the timer T1 expires, the transmit power is recovered by a (dBm) until the original transmit power is achieved, wherein a (dBm) is a predetermined adjustment magnitude or an adjustment magnitude specified in the power adjustment signaling. Of course, other adjustment method may also be used, please refer to the prior art for the detail, and herein is omitted.

Optionally, before the power of the interference source HNB is adjusted, the interference source HNB may be paged, so as to notify the interference source HNB to perform power adjustment. That is, before adjusting the power of the interference source HNB, the method for interference management may include: paging the interference source HNB.

Optionally, after the terminal leaves the interference source HNB, the NBC may notify the HNB to recover the original power, or the HNB may recover the original power by itself according to the recovery time. That is, after adjusting the power of the interference source HNB, the method for interference management may further include: notifying the interference source HNB to recover the power after determining that the terminal leaves the interference source HNB.

To be noted, the power mentioned herein is the transmit power.

As can be seen from the above content, in the embodiment of the present invention, the HNB registers in the NBC of the macro cell in advance, so that the NBC knows the potential interference source HNB beforehand. Simply through a normal measurement and a report subsequently made by the terminal, an interference source HNB can be found easily, and an interference management of the interference source HNB can be performed. The solution can avoid the situation in the prior art that the interference management is performed necessarily with a cell identity of the interference source HNB obtained by the terminal (i.e., a system message is received from the interference source HNB), and the interference management to the HNB can be performed timely and effectively and the interference experienced by the terminal from the HNB is reduced.

Another method embodiment of the method for interference management provided by the embodiment of the present invention is described as follows.

The embodiment is described in the perspective of an HNB.

A method for interference management, comprising: sending to an NBC of a macro cell a register request carrying register information; receiving from the NBC a register response indicating that the registration is successful; and accepting a power adjustment made by the NBC when the HNB is determined as an interference source HNB.

In which, the NBC specifically may be a network control apparatus such as the RNC.

Figure 2:
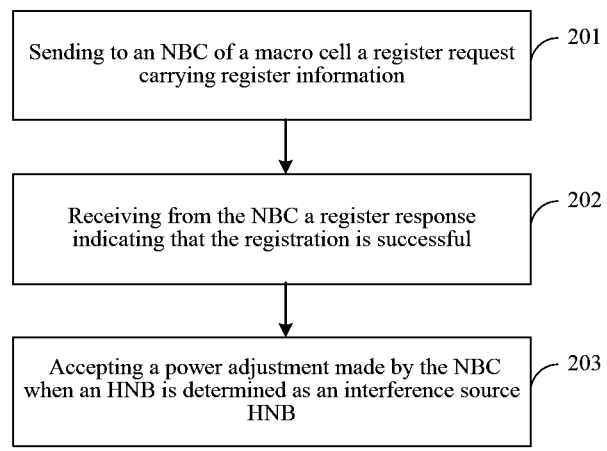
FIG. 2 is another flowchart of A method for interference management according to an embodiment of the present invention.

Referring to FIG. 2, the flows of A method for interference management may be specifically described as follows.

201: sending to an NBC of a macro cell a register request carrying register information.

In which, the register information may include the basic information of the HNB and other information.

For example, the basic information may include the PSC of the HNB, and/or the transmit power of the HNB, and/or the access mode, and/or the access control list, etc.

The other information may include the quality of the macro cell signal received by the HNB, and/or a path loss from the HNB to the macro cell, and/or the quality of other neighbor cell signal received by the HNB, and/or a time difference information between the HNB and the macro cell, and/or location information of the HNB, and the like. In which, the location information specifically may be various positioning information, such as the GPS positioning information.

During the implementation, the HNB may send the register request to the NBC through an air interface signaling, a Home Node B Gateway (HNB-GW), a Core Network (CN), or a direct interface between the HNB and the NBC.

202: receiving a register response indicating that the registration is successful, returned from the NBC.

203: accepting a power adjustment made by the NBC when an HNB is determined as an interference source HNB.

For example, when the HNB is determined as an interference source HNB, an air interface signaling carrying power control information may be received from the NBC, and the transmit power is adjusted according to the air interface signaling. Or, a power adjustment signaling may be received from the NBC, and the transmit power is adjusted according to the power adjustment signaling. In which, the power control information or the power adjustment signaling may include adjustable range, and/or adjustment magnitude, and/or time information of the power, wherein the time information may include start time and/or recovery time of the power adjustment, etc.

For example, the adjusting method specifically may be as follows:

After receiving a power adjustment signaling sent by the NBC (e.g., RNC), the HNB decreases the transmit power according to a preset policy negotiated by the NBC and the HNB, or the adjustment information in the power control signaling. For example, the transmit power may be decreased stepwise, i.e., each time a power adjustment signaling is received, the transmit power is decreased by a (dBm) and the timer T1 is started. If a power adjustment signaling is received again before the timer T1 expires, the transmit power is further decreased by a (dBm) and the timer T1 is restarted, while if no power adjustment signaling is received when the timer T1 expires, the transmit power is recovered by a (dBm) until the original transmit power is achieved, wherein a (dBm) is a predetermined adjustment magnitude or an adjustment magnitude specified in the power adjustment signaling. Of course, other adjustment method may be used, please refer to the prior art for the detail, and herein is omitted.

In which, the NBC may determine whether the HNB is an interference source HNB according to the register information and the measurement information reported by the terminal, please refer to the previous embodiment for the detail, and herein is omitted. In which, the measurement information reported by the terminal may include the measured PSC of the HNB, and/or the measured signal quality, and/or the measured time difference information between the HNB and the macro cell, and/or the measured location information of the HNB, etc., wherein the location information specifically may be various positioning information, such as the GPS positioning information.

To be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information generally may be set as a subset of the register information. For example, when the register information includes the transmit power of the HNB, the PSC of the HNB, the access mode, the access control list and the signal quality, the measurement information to be reported by the terminal may include the PSC of the HNB and the signal quality. For another example, when the register information includes the location information of the HNB, the measurement information to be reported by the terminal specifically may be the measured location information of the HNB.

During the implementation, the HNB may select, according to signal strength, an NBC to initiate a registration, or configure in advance, in an HNB Management System (HMS), an NBC to which the HNB initiates a registration. That is, optionally, before sending the register request to the NBC of the macro cell, the method for interference management may further include:

selecting an NBC according to signal strength; or selecting an NBC according to a configuration in the HMS.

In that case, step 201, i.e., sending the register request to the NBC of the macro cell, specifically may be sending the register request to the selected NBC.

Optionally, when the register information of the HNB is changed, an update request may also be sent to the NBC to update the register information stored in the NBC, i.e., the method for interference management may further include: updating the register information, and sending the updated register information to the NBC through an update request, so that the NBC updates the register information.

In a case where the carried time information includes the recovery time when the NBC adjusts the power of the HNB, the transmit power may be adjusted to the original magnitude when the recovery time arrives after the power adjustment of the NBC is accepted. Or, the HNB may directly receive from the NBC a notification indicating to recover the power, and adjust the transmit power to the initial transmit power (i.e., the original magnitude of the transmit power) according to the notification.

As can be seen from the above content, in the embodiment of the present invention, the HNB registers in the NBC of the macro cell in advance, so that the NBC knows the potential interference source HNB beforehand. Simply through a normal measurement and a report subsequently made by the terminal, an interference source HNB can be found easily, and an interference management of the interference source HNB can be performed. The solution can avoid the situation in the prior art that the interference management is performed necessarily with a cell identity of the interference source HNB obtained by the terminal, and the interference management to the HNB can be performed timely and effectively and the interference experienced by the terminal from the HNB is reduced.

The method described with reference to the above two method embodiments will be further explained in detail through an example. In the present embodiment, explanations are made by taking the NBC specifically being an RNC as an example.

The method for interference management specifically may be implemented in three stages described as follows.

(I) Stage 1: the HNB selects an RNC, and initiates a registration process to report register information.

1. The HNB selects an RNC:

In the coverage range of the HNB, the signals of one or more common-frequency, pilot-frequency or inter-system cells may be detected. After the HNB is powered on, a downlink detection will be performed to acquire the basic information and the signal qualities of those cells. Meanwhile, optionally, the HNB may select a frequency point having the minimum interference as the frequency point of the HNB, or use a configured frequency point as the frequency point of the HNB.

After the selecting the frequency point or using the configured frequency point, the HNB initiates a registration process by selecting an RNC of a common-frequency macro cell having the strongest signal according to the detected signal quality of each cell.

2. The HNB initiates a registration process to the RNC to report register information.

The HNB initiates a registration process to the RNC directly through an air interface message, and the reported register information includes the basic information of the HNB and other information. In which, the basic information of the HNB may include the transmit power of the HNB, and/or the PSC of the HNB, and/or the access mode, and/or the access control list, etc., and other information may include the time difference information between the HNB and the macro cell, and/or the quality of the macro cell signal received by the HNB, and/or the path loss from the HNB to the macro cell, and/or the quality of other neighbor cell signal received by the HNB, and/or the location information of the HNB, etc.

The RNC may calculate the path loss according to the transmit power of the macro cell and the quality of the macro cell signal received by the HNB, and then position the HNB according to the path loss, or a path loss reported by the HNB and other information of the HNB. Or, the RNC may also position the HNB according to the location information reported by the HNB, such as the GPS positioning information.

Optionally, after receiving a register request from the HNB, the RNC may determine whether the macro NodeB is interfered with according to the transmit power of the HNB, and directly adjust the transmit power of the HNB by registering a response.

In addition, when the register information of the HNB is changed, the updated register information may be notified to the RNC through an update request.

(II) Stage 2: the terminal reports a measurement, and determines an interference source HNB.

When approaching the HNB, the terminal performs a normal measurement (refer to the prior art) of the HNB to acquire measurement information, which may include the measured PSC of the HNB, and/or the measured signal quality, and/or the measured time difference information between the HNB and the macro cell, and/or the measured location information of the HNB, wherein the location information specifically may be various positioning information, such as the GPS positioning information. For example, when determining that the signal of the HNB exceeds a predetermined threshold, the terminal acquires information such as the PSC of the HNB, and/or the signal quality, and/or the time difference between the HNB and the macro cell, and then reports the information to the RNC, wherein the predetermined threshold may be set according to the requirement of the practical application.

The RNC may specifically determine the interference source HNB according to the measurement information and the register information reported during the registration of the HNB.

For example, the RNC may match the measured PSC of the HNB, and/or the measured signal quality, and/or the measured time difference information between the HNB and the macro cell, and/or the measured location information of the HNB in the measurement information with the PSC of the HNB, and/or the quality of the macro cell signal received by the HNB, and/or the time difference information between the HNB and the macro cell, and/or the location information of the HNB in the register information to determine a target HNB, and determine whether the target HNB is an interference source HNB according to the access mode and the access control list in the register information, or determine whether the target HNB is an interference source HNB according to the access mode, the neighbor cell list of the macro cell and the capability of the terminal. For example, the target HNB is determined as an interference source HNB when the access mode of the target HNB is a closed mode, the target HNB is not in the neighbor cell list of the macro cell and the terminal does not support the CSG, otherwise it means that the terminal can access the target HNB, and the RNC does not adjust the power of the target HNB, i.e., the step of Stage 3 is not performed. For another example, the target HNB is determined as an interference source HNB when the access mode of the target HNB is a closed mode and the access control list indicates that the terminal is not allowed to access, otherwise it means that the terminal can access the target HNB, and the RNC does not adjust the power of the target HNB, i.e., the step of Stage 3 is not performed.

(III) Stage 3: Interference Management Process

The RNC adjusts the power of the interference source HNB, e.g., the RNC may adjust the transmit power of the HNB using a power control command through an air interface signaling, or adjust the transmit power by directly sending a power adjustment signaling to the HNB. Of course, the HNB may be paged before the adjustment.

In that case, at the same time of providing a service to the terminal of the cell, the HNB also needs to receive related power control command or power adjustment signaling issued by the RNC, and decrease the transmit power according to the power control command or the power adjustment signaling.

Optionally, when finding that the terminal leaves the interference source HNB, the RNC may also notify the interference source HNB to recover the original power. Or, if the RNC sends time information including recovery time to an interference source HNB while adjusting the power of the HNB, the HNB may also recover the transmit power by itself according to the time information, i.e., recovering the original power magnitude when the recovery time arrives.

According to the above described method, an example will be given as follows for a detailed explanation.

Figure 3A:
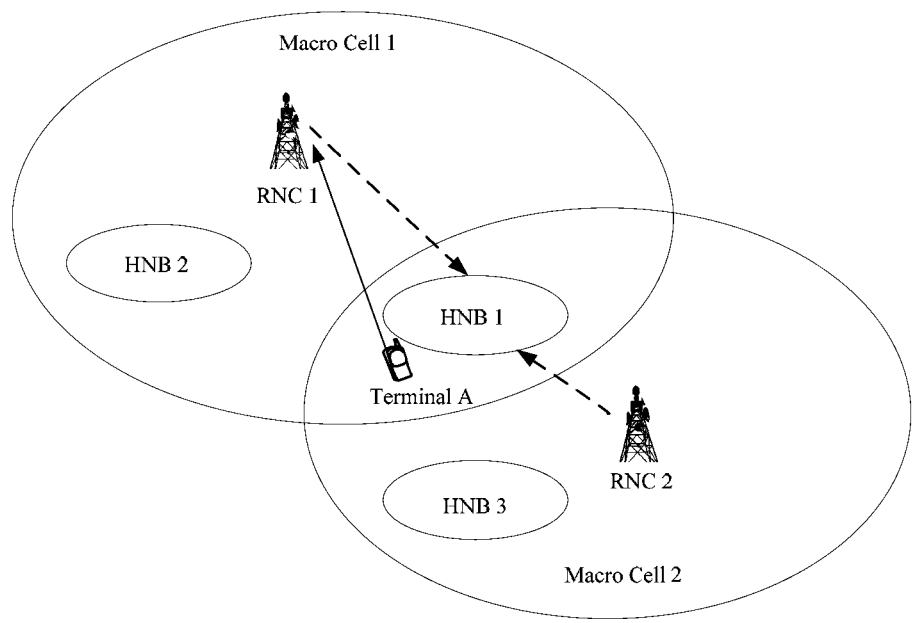
FIG. 3a is a network scenario diagram in an embodiment of the present invention.

Referring to FIG. 3a, there are two macro cells in the network, i.e., macro cell 1 and macro cell 2, wherein the RNC of macro cell 1 is RNC 1, and the RNC of macro cell 2 is RNC 2. The network further includes HNB 1, HNB 2 and HNB 3, wherein HNB 1 is in an overlap region between macro cell 1 and macro cell 2, and currently, terminal A is approaching to HNB 1.

Figure 3B:
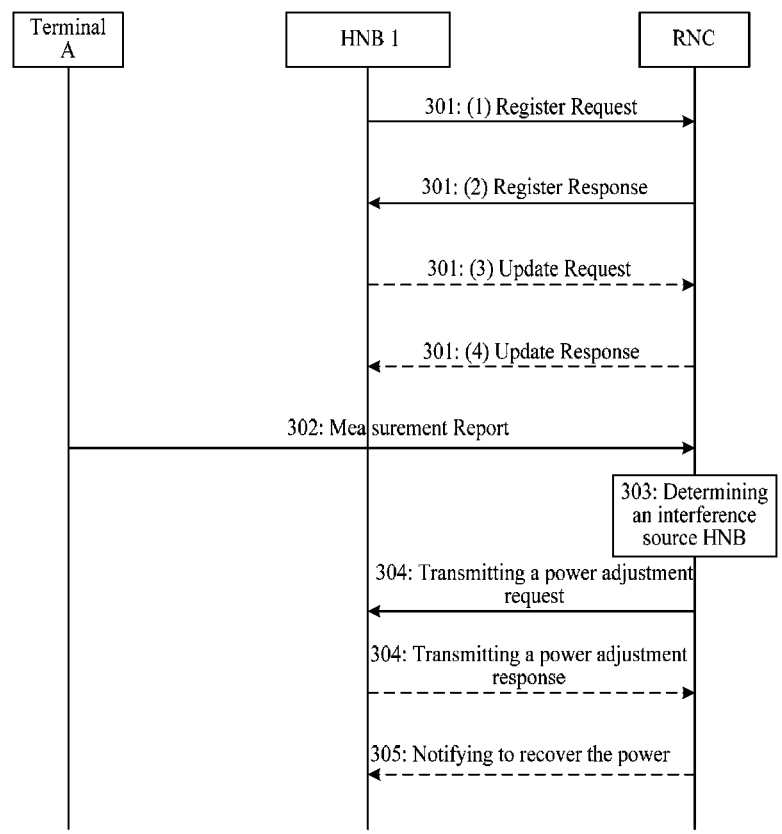
FIG. 3b is still another flowchart of A method for interference management according to an embodiment of the present invention.

Referring to FIG. 3b, the detailed process may be as follows.

301: after being powered on, HNB 1, HNB 2 and HNB 3 perform downlink detection respectively, acquire signals of respective cells detectable in coverage ranges thereof, respectively, and select an RNC of a common-frequency macro cell having the strongest signal to initiate a registration process.

For example, in the embodiment, as HNB 1 is in the overlap region between macro cell 1 and macro cell 2, HNB 1 can detect the signals of macro cell 1 and macro cell 2, which both have strong signal strengths. Thus, HNB 1 selects the RNCs (i.e., RNC 1 and RNC 2) of macro cell 1 and/or macro cell 2 to initiate a registration process. Since HNB 2 is in the overlap range of macro cell 1, HNB 2 selects RNC 1 of macro cell 1 to initiate a registration process. Similarly, HNB 3 selects RNC 2 of macro cell 2 to initiate a registration process.

In which, in an example where HNB 1 initiates a registration process to RNC 1, the registration process specifically may be as follows.

1) HNB 1 sends to RNC 1 a register request carrying register information;

2) RNC 1 positions (i.e., registers) HNB 1 based on the received register information, and returns to HNB 1 a register response indicating that the registration is successful;

Optionally, steps 3) and 4) may be performed.

3) HNB 1 sends to RNC 1 an update request carrying updated register information;

4) RNC 1 updates the stored register information, and returns an update response to HNB 1.

302: when detecting that the signal strength of HNB 1 exceeds a predetermined threshold, terminal A measures HNB 1 to acquire measurement information. For example, terminal A acquires information such as PSC 1 of HNB 1, and/or signal quality 1, and/or the time difference information between the HNB and the macro cell, and report the information to RNC 1. For example, terminal A reports the information to RNC 1 specifically through a measurement report.

To be noted, the terminal may select an RNC according to a preset policy and then report to it, wherein the preset policy may be set according to the requirement of the practical application. Generally, the terminal will select a service RNC and then report to it. For the convenience of description, in the embodiment an example is given by taking RNC 1 as the service RNC of terminal A, i.e., terminal A reports to RNC 1. It shall be appreciated that if RNC 2 is the service RNC of terminal A, terminal A may also report the measurement information to RNC 2, and then RNC 2 controls the power of HNB 1. The method is implemented in the same way, and herein is omitted.

Further to be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information generally may be set as a subset of the register information. For example, when the register information includes the transmit power of the HNB, the PSC of the HNB, the access mode, the access control list and the signal quality, the measurement information to be reported by the terminal may include the PSC of the HNB and the signal quality. For anther example, when the register information includes the location information of the HNB, the measurement information to be reported by the terminal specifically may be the measured location information of the HNB.

303: after receiving the measurement information reported by terminal A, RNC 1 matches the measurement information with the register information of each HNB stored in RNC 1, so as to determine an interference source HNB.

For instance, an example is specifically given as follows, where the measurement information includes the PSC of the HNB and the signal quality.

In this embodiment, since HNB 1 and HNB 2 both initiate a registration process to RNC 1, RNC 1 stores the register information of HNB 1 and HNB 2. Refer to Table 1:

TABLE 1

|       | PSC  | Signal quality   |     |
|-------|------|------------------|-----|
| HNB 1 | PSC1 | Signal quality 1 | ... |
| HNB 2 | PSC2 | Signal quality 2 | ... |
| ...   | ...  | ...              | ... |

After receiving PSC 1 and signal quality 1 reported by terminal A, RNC 1 matches PSC 1 and signal quality 1 with the stored PSC and signal quality of each HNB, as shown in Table 1. Since the PSC of HNB 1 is PSC1 and the signal quality is signal quality 1, the RNC determines that HNB 1 is a target HNB.

Next, RNC 1 determines whether the target HNB is an interference source HNB according to the access mode of HNB 1 and the access control list, or determines whether the target HNB is an interference source HNB according to the access mode of HNB 1, the neighbor cell list of the macro cell and the subscription information of terminal A (i.e., determining whether terminal A belongs to the CSG). For example, when the access mode of HNB 1 is a closed mode and terminal A does not belong to the CSG of HNB 1, it can be determined that HNB 1 is the interference source HNB of terminal A.

304: RNC 1 sends a power adjustment signaling to HNB 1, and decreases the transmit power of HNB 1, so as to reduce the interference of HNB 1 to terminal A. For example, RNC 1 specifically may send a transmit power adjust request to HNB 1. Optionally, the HNB may return a transmit power adjust response to the RNC.

In which, the power adjustment signaling may include adjustable range, and/or adjustment magnitude, and/or time information, etc. of the power, wherein the time information may include start time and/or recovery time of the power adjustment, etc.

Optionally, before step 304, RNC 1 may page HNB 1 first, so as to notify HNB 1 to perform power adjustment.

305: when determining that the terminal leaves HNB 1, RNC 1 notifies HNB 1 to recover the original power magnitude. Or, when determining that the recovery time arrives, HNB 1 recovers the power to the original power magnitude by itself. This step (i.e., step 305) is optional.

In which, the HNB may adjust (including increase and decrease) the power stepwise, please refer to the prior art, and herein is omitted.

As can be seen from the above content, in the embodiment of the present invention, the HNB registers in the NBC of the macro cell in advance, so that the NBC knows the potential interference source HNB beforehand. Simply through a normal measurement and a report subsequently made by the terminal, an interference source HNB can be found easily, and an interference management of the interference source HNB can be performed. The solution can avoid the situation in the prior art that the interference management is performed necessarily with a cell identity of the interference source HNB obtained by the terminal, and the interference management to the HNB can be performed timely and effectively and the interference experienced by the terminal from the HNB is reduced.

In the previous method embodiment, the HNB may select the RNC according to the signal strength of each cell, so as to initiate the registration process. In addition, the HMS may uniformly configure the RNC to which the HNB initiates the registration process.

In addition, in the registration process initiated by the HNB to the RNC, the HNB can not only directly communicate with the RNC (e.g., directly sending a register request to the RNC, or directly receive a register response from the RNC), but also serve as a network apparatus and communicate with the RNC through an HNB-GW or a Core Network (CN) (e.g., forwarding the register request to the RNC through the HNB-GW or the CN. Or, the HNB may transmit information through a direct interface with the RNC, provided that the HNB has acquired downlink transmit power of the macro cell, then calculate corresponding path loss in combination with the measured signal quality of the macro cell, and carry the path loss in the register information and report to the RNC.

Other steps of the embodiment are the same as those in the previous embodiment, and herein are omitted.

As can be seen from the above content, the embodiment not only achieves the same beneficial effect as the previous method embodiment, but also provides other manners for selecting the RNC and communicating with the RNC, which are flexible to be implemented, and may be selected according to the requirement of the practical application in the implementation.

To be noted, for the convenience of description, the above embodiments are just described by taking the Universal Mobile Telecommunications System (UMTS) network as the example. It shall be appreciated that the embodiments of the present invention are also applicable to wireless network, such as the Global System for Mobile Communications (GSM), the General Packet Radio Service (GPRS) network, the Wideband Code Division Multiple Access 2000 (WCDMA 2000) system, the Time Division-Synchronous Code Division Multiple Access (TD-SCDMA) system, the Long Term Evolution (LTE) system, the Wireless Local Area Networks (WLAN)/wireless fidelity (WiFi) network, or Worldwide Interoperability for Microwave Access (WiMAX) network, etc., and the details are omitted herein.

Figure 4A:
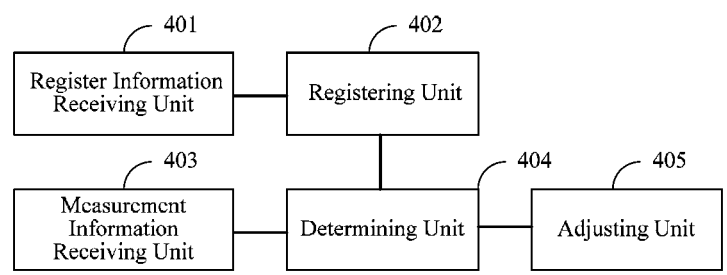
FIG. 4a is a structural schematic diagram of a NodeB Controller (NBC) according to an embodiment of the present invention.

In order to better implement the above method, the embodiment of the present invention correspondingly provides an NBC, as illustrated in FIG. 4a, including a register information receiving unit 401, a registering unit 402, a measurement information receiving unit 403, a determining unit 404 and an adjusting unit 405.

The register information receiving unit 401 is configured to receive from an HNB a register request carrying register information. In which, the register information may include the basic information of the HNB and other information.

For example, the basic information of the HNB may include a PSC of the HNB, and/or a transmit power of the HNB, and/or an access mode, and/or an access control list.

Other information of the HNB may include the quality of the macro cell signal received by the HNB, and/or the path loss from the HNB to the macro cell, and/or the quality of other neighbor cell signal received by the HNB, and/or the time difference information between the HNB and the macro cell, and/or the location information of the HNB. In which, the location information specifically may be various positioning information, such as the GPS positioning information.

The registering unit 402 is configured to position the HNB according to the register information received by the register information receiving unit 401, and return to the HNB a register response indicating that the registration is successful.

The measurement information receiving unit 403 is configured to receive measurement information related to the HNB reported by a terminal.

In which, the measurement information may include the measured PSC of the HNB, and/or the measured signal quality, and/or the measured time difference information between the HNB and the macro cell, and/or the measured location information of the HNB, wherein the location information specifically may be various positioning information, such as the GPS positioning information.

To be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information is corresponding to the register information.

The determining unit 404 is configured to determine an interference source HNB of the terminal according to the register information and the measurement information received by the measurement information receiving unit 403.

The adjusting unit 405 is configured to perform power adjustment on the interference source HNB determined by the determining unit 404.

To be noted, if it is determined that the target HNB is not an interference source HNB, the power of the HNB will not be adjusted.

Optionally, the registering unit 402 is specifically configured to position the HNB according to the path loss from the macro cell to the HNB, the PSC of the HNB and the quality of other neighbor cell signal received by the HNB. For example, a path loss may be calculated according to the transmit power and the signal quality of the macro cell, and then the HNB is positioned according to the path loss and the PSC of the HNB, and/or the quality of other neighbor cell signal received by the HNB. Or, the registering unit 402 may be specifically configured to position the HNB according to the PSC of the HNB and the quality of other neighbor cell signal received by the HNB. Or, the registering unit 402 may be specifically configured to position the HNB according to the path loss from the macro cell to the HNB and the PSC of the HNB. Or, the registering unit 402 may be specifically configured to position the HNB according to the PSC of the HNB and the time difference information between the HNB and the macro cell. Or, the registering unit 402 may be specifically configured to position the HNB according to the PSC of the HNB and the location information of the HNB. Or, the registering unit 402 may be specifically configured to position the HNB according to the location information of the HNB.

Optionally, in that case, the NBC may further determine whether there is any interference to the macro cell according to the transmit power of the HNB, and if there is, the transmit power of the HNB may be adjusted, i.e., the adjusting unit 405 is further configured to adjust the transmit power of the HNB when determining, according to the transmit power of the HNB, that the HNB interferes to the macro cell, before the registering unit 402 returns to the HNB the register response indicating that the registration is successful.

Figure 4B:
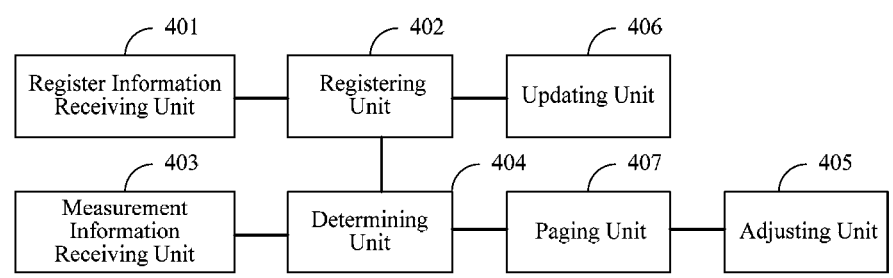
FIG. 4b is another structural schematic diagram of an NBC according to an embodiment of the present invention.

Optionally, when the register information of the HNB, such as the basic information or the signal quality is changed, the NBC may be notified through an update request, i.e., as illustrated in FIG. 4b, the NBC may further include an updating unit 406.

The updating unit 406 is configured to receive from the HNB an update request carrying updated register information.

In that case, the registering unit 402 is further configured to position the HNB according to the updated register information received by the updating unit 406.

The determining unit 404 is further configured to determine an interference source HNB of the terminal according to the updated register information and the measurement information.

For example, when the adjusting unit 405 adjusts the power of the HNB, the HNB re-notifies the adjusted transmit power to the NBC after the transmit power is adjusted, then the updating unit 406 of the NBC receives from the HNB the update request carrying the updated transmit power. Next, the registering unit 402 positions the HNB according to the updated transmit power and in conjunction with other original register information. The determining unit 404 also determines the interference source HNB of the terminal according to the updated transmit power and in conjunction with other original register information in addition to the measurement information received by the measurement information receiving unit 403.

In which, the determining unit 404 may include a matching subunit and a determining subunit.

The matching subunit is configured to match the PSC of the HNB, and/or the quality of the macro cell signal received by the HNB, and/or the time difference information between the HNB and the macro cell, and/or the location information of the HNB in the register information with the measured PSC of the HNB, and/or the measured signal quality, and/or the measured time difference information between the HNB and the macro cell, and/or the measured location information of the HNB in the measurement information; and when they are matched with each other, determine that the HNB is a target HNB.

The determining subunit is configured to determine that the target HNB determined by the matching subunit is an interference source HNB, when it is determined, according to the access mode and the access control list in the register information, that the terminal cannot access the target HNB; or determine that the target HNB determined by the matching subunit is an interference source HNB, according to the access mode in the register information, the neighbor cell list of the macro cell and the CSG capability of the terminal. For example, the target HNB is determined as the interference source HNB if the access mode of the target HNB is a closed mode, the target HNB is not in the neighbor cell list of the macro cell and the terminal does not support the CSG capability.

The adjusting unit 405 is specifically configured to send to the HNB an air interface signaling carrying power control information, or send to the HNB a power adjustment signaling. In which, the power control information or the power adjustment signaling may include adjustable range, and/or adjustment magnitude, and/or time information of the power. Please refer to the above method embodiments for the detail, and herein is omitted.

Optionally, the interference source HNB may be paged before the power thereof is adjusted, so as to determine whether the power of the interference source HNB shall be adjusted, i.e., referring to FIG. 4b, the NBC may also include a paging unit 407.

The paging unit 407 is configured to page the interference source HNB determined by the determining unit 404.

Then the adjusting unit 405 is configured to perform power adjustment on the interference source HNB when the paging unit 407 pages the interference source HNB.

Further, after the terminal leaves the interference source HNB, the NBC may notify the HNB to recover the original power.

The adjusting unit 405 is further configured to notify the interference source HNB to recover the power when it is determined that the terminal leaves the interference source HNB.

During implementation, the above units may be implemented as individual entities, or one or more entities. For the embodiments of the above respective units, please refer to the above method embodiments, and herein are omitted.

The NBC specifically may be a network control apparatus such as the RNC.

As can be seen from the above content, in the embodiment, the register information receiving unit 401 and the registering unit 402 in the NBC can accept the registration of the HNB, so that the NBC knows the potential interference source HNB beforehand. Simply through a normal measurement and a report subsequently made by the terminal, the determining unit 404 can easily find an interference source HNB, and the adjusting unit 405 performs an interference management of the interference source HNB. The solution can avoid the situation in the prior art that the interference management is performed necessarily with a cell identity of the interference source HNB obtained by the terminal, and the interference management to the HNB can be performed timely and effectively and the interference experienced by the terminal from the HNB is reduced.

Figure 5A:
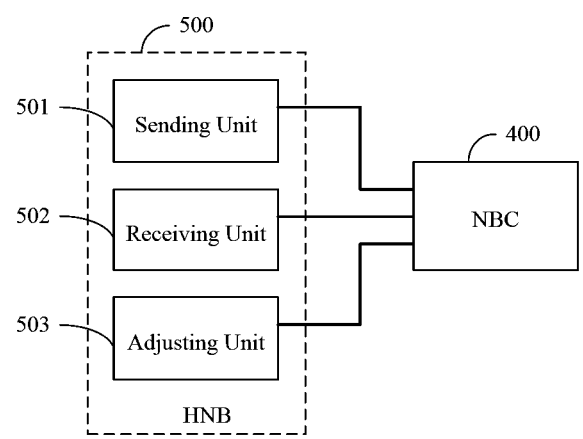
FIG. 5a a structural schematic diagram of an HNB according to an embodiment of the present invention.

Correspondingly, the embodiment of the present invention further provides an HNB, as illustrated in FIG. 5a, the HNB 500 includes a sending unit 501, a receiving unit 502 and an adjusting unit 503. In order to give a clearer description, FIG. 5a further illustrates an NBC 400, wherein the NBC 400 specifically may be a network control apparatus such as the RNC.

The sending unit 501 is configured to send to the NBC 400 of a macro cell a register request carrying register information.

The register information may include the basic information of the HNB and other information.

For example, the basic information of the HNB may include the transmit power of the HNB, and/or the PSC of the HNB, and/or the access mode, and/or the access control list, etc.

Other information may include the quality of the macro cell signal received by the HNB, and/or a path loss from the HNB to the macro cell, and/or the quality of other neighbor cell signal received by the HNB, and/or a time difference information between the HNB and the macro cell, and/or location information of the HNB. In which, the location information specifically may be various positioning information, such as the GPS positioning information.

The receiving unit 502 is configured to receive from the NBC 400 a register response indicating that the registration is successful.

The adjusting unit 503 is configured to accept a power adjustment made by the NBC 400 when the HNB 500 is determined as an interference source HNB.

In which, the NBC may determine whether the HNB 500 is an interference source HNB according to the register information and the measurement information reported by the terminal, please refer to the previous embodiment for the detail, and herein is omitted. In which, the measurement information reported by the terminal may include the measured PSC of the HNB, and/or the measured signal quality, and/or the measured time difference information between the HNB and the macro cell, and/or the measured location information of the HNB, etc., wherein the location information specifically may be various positioning information, such as the GPS positioning information. To be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information is corresponding to the register information.

Figure 5B:
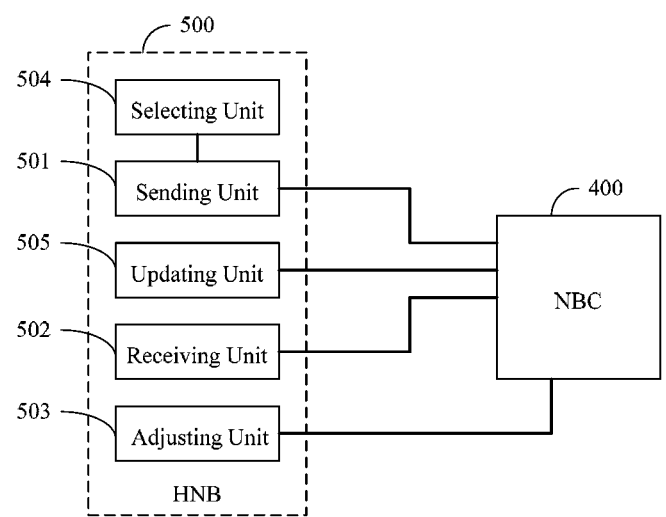
FIG. 5b another structural schematic diagram of an HNB according to an embodiment of the present invention.

During the implementation, the HNB may select, according to signal strength, an NBC to initiate a registration, or configure in advance in an HMS, an NBC to which the HNB initiates a registration. That is, referring to FIG. 5b, the HNB 500 may further include a selecting unit 504.

The selecting unit 504 is configured to select an NBC according to the signal strength, or select an NBC according to a configuration in an HMS.

The sending unit 501 is specifically configured to send a register request to the NBC 400 selected by the selecting unit 504.

Optionally, when the register information of the HNB 500 is changed, an update request may be sent to the NBC 400, so as to update the register information stored in the NBC 400, i.e., the HNB 500 may further include an updating unit 505.

The updating unit 505 is configured to update the register information.

In that case, the sending unit 501 is further configured to send the register information updated by the updating unit 505 to the NBC 400 through an update request, so that the NBC updates the register information.

In which, the adjusting unit 503 may include a signaling receiving subunit and an adjusting subunit.

The signaling receiving subunit is configured to receive from the NBC 400 an air interface signaling carrying power control information or a power adjustment signaling.

The adjusting subunit is configured to adjust the transmit power according to the air interface signaling or the power adjustment signaling received by the signaling receiving subunit.

In which, the power control information or the power adjustment signaling includes adjustable range of the power, adjustment magnitude, and/or time information, wherein the time information may include start time and/or recovery time of the power adjustment, etc. Please refer to the above method embodiments for the detail, and herein is omitted.

If the time information includes the recovery time,
the adjusting unit, for example specifically being the adjusting subunit, is further configured to adjust the transmit power to the original magnitude when the recovery time arrives.

Or, besides the HNB recovers the power by itself, the NBC may notify the HNB to recover the power, i.e.,
the receiving unit 502 is further configured to receive from the NBC 400 a notification indicating to recover the power.

In that case, the adjusting unit 503 is further configured to adjust the transmit power to the original magnitude according to the notification received by the receiving unit 502.

During implementation, the above respective units may be implemented as individual entities, or one or more entities. For the embodiments of the above respective units, please refer to the above method embodiments, and herein are omitted.

As can be seen from the above content, in the embodiment, the sending unit 501 of the HNB 500 can register in the NBC of the macro cell in advance, so that the NBC 400 knows the potential interference source HNB beforehand. Simply through a normal measurement and a report of measurement information to the NBC 400 subsequently made by the terminal, the NBC 400 can easily find an interference source HNB 500, and perform an interference management of the interference source HNB 500. The solution can avoid the situation in the prior art that the interference management is performed necessarily with a cell identity of the interference source HNB 500 obtained by the terminal, and the interference management to the HNB 500 can be performed timely and effectively and the interference experienced by the terminal from the HNB 500 is reduced.

Correspondingly, the embodiments of the present invention further provide a communication system, including any of the NBCs and any of the HNBs provided by the embodiments of the present invention, wherein the NBC specifically may be a network control apparatus such as the RNC.

The NBC is configured to receive from an HNB a register request carrying register information; position the HNB according to the register information, and return to the HNB a register response indicating that the registration is successful; receive measurement information related to the HNB reported by a terminal; determine an interference source HNB of the terminal according to the register information and the measurement information; and perform power adjustment on the determined interference source HNB.

The HNB is configured to send to an NBC of a macro cell a register request carrying register information; receive from the NBC a register response indicating that the registration is successful; and accept a power adjustment made by the NBC when the HNB is determined as an interference source HNB.

In which, the register information may include the basic information of the HNB and other information, wherein the basic information of the HNB may include a PSC of the HNB, and/or a transmit power of the HNB, and/or an access mode, and/or an access control list; and other information may include the quality of the macro cell signal received by the HNB, and/or a path loss from the HNB to the macro cell, and/or the quality of other neighbor cell signal received by the HNB, and/or a time difference information between the HNB and the macro cell, and/or location information of the HNB.

The measurement information may include the measured PSC of the HNB, and/or the measured signal quality, and/or the measured time difference information between the HNB and the macro cell, and/or the measured location information of the HNB, wherein the location information specifically may be various positioning information, such as the GPS positioning information.

To be noted, in order to save the time for the terminal to acquire those measurement information, and reduce the information amount of the register information carried by the HNB during a registration, the contents of the register information and the measurement information may be selected according to the requirement of the practical application in the implementation, wherein the measurement information is corresponding to the register information.

Please refer to the aforementioned embodiments for the implementations of the above respective apparatuss, and herein are omitted.

The communication system is specifically applicable to the wireless network, such as UMTS, GSM, GPRS, WCDMA 2000, TD-SCDMA, LTE, WLAN/WiFi or WiMAX, etc.

As can be seen from the above content, in the embodiment, the communication system enables the HNB to register in the NBC of the macro cell in advance, so that the NBC knows the potential interference source HNB beforehand. Simply through a normal measurement and a report subsequently made by the terminal, an interference source HNB can be easily found, and an interference management of the interference source HNB can also be performed. The solution can avoid the situation in the prior art that the interference management is performed necessarily with a cell identity of the interference source HNB obtained by the terminal, and the interference management to the HNB can be performed timely and effectively and the interference experienced by the terminal from the HNB is reduced To be noted, the respective aspects are described herein in conjunction with the wireless terminal and/or the NodeB. The wireless terminal may refer to an apparatus that provides the user with voices and/or data connectivity. The wireless terminal may be connected to a computing apparatus such as laptop computer or desktop computer, or other communication apparatus such as a self-contained apparatus like Personal Digital Assistant (PDA). The wireless terminal may also be called as system, subscriber unit, subscriber station, mobile station, mobile, remote station, access point, remote terminal, access terminal, user terminal, user agent, user apparatus or user equipment. The wireless terminal may be subscriber station, wireless apparatus, cellular phone, Personal Communication Service (PCS) phone, cordless phone, Session Initiation Protocol (SIP) phone, Wireless Local Loop (WLL) station, PDA, handheld apparatus having the wireless connection function, or other processing apparatus connected to the wireless modem.

The NodeB may be a Base Transceiver Station (BTS) in the GSM or the CDMA, a NodeB in the WCDMA, or an evolutional NodeB (eNB or e-NodeB) in the LTE, and herein is not limited. But for the convenience of description, the eNB is taken as an example in the embodiments.

Respective aspects will be described in the form of a system that may include one or more apparatuses, components, modules or units. It shall be understood or appreciated that various systems may include additional apparatuses, components, modules and/or units, and/or may not include all those apparatuses, components, modules and units discussed with reference to the drawings. In another aspect of the present invention, combinations of the above measures may be employed.

In addition, the term "and/or" herein is just an association relation that describes the associated objects, and it indicates that there may be three relations. For example, A and/or B may indicate the following three conditions: A is existed separately, A and B are existed at the same time, and B is existed separately. In addition, the character "/" generally indicates that the relation between the associated objects is "or".

A person skilled in the art shall appreciate that all or a part of steps in the above method embodiments may be implemented by instructing relevant hardware through a program that may be stored in a computer readable storage medium, including Read Only Memory (ROM), Random Access Memory (RAM), magnetic disk, optical disk, etc.

A method, an apparatus and a system for interference management provided by the embodiments of the present invention are detailedly introduced as above. The principle and the implementations of the present invention are elaborated through specific examples. But the descriptions of those embodiments are only used to promote the understanding of the method and the core idea of the present invention. Meanwhile, a person skilled in the art may change the implementations and the application range according to the idea of the present invention. In conclusion, the specification shall not be construed as limitations to the present invention.

What is claimed is:

1. A method for interference management of a home NodeB (HNB), the method comprising:
   receiving from the HNB a register request including register information;
   registering the HNB according to the register information;
   returning to the HNB a register response indicating that the registering is successful;
   receiving measurement information related to the HNB reported by a terminal;
   determining an interference source HNB of the terminal according to the register information and the measurement information; and
   performing a power adjustment on the interference source HNB,
   wherein the register information comprises basic information of the HNB and other information;
   wherein the basic information comprises at least one of a primary scrambling code (PSC) of the HNB, a transmit power of the HNB, an access mode, or an access control list;
   wherein the other information comprises at least one of: a quality of a macro cell signal received by the HNB, a path loss from the HNB to a macro cell, a quality of a neighbor cell signal received by the HNB, time difference information between the HNB and the macro cell, or location information of the HNB; and
   wherein the measurement information comprises at least one of: a measured PSC of the HNB, a measured signal quality, measured time difference information between the HNB and the macro cell, or measured location information of the HNB,
   wherein the determining the interference source HNB of the terminal according to the register information and the measurement information comprises:
   matching the PSC of the HNB, the time difference information between the HNB and the macro cell, the location information of the HNB, and the quality of the macro cell signal received by the HNB in the register information with corresponding the measured PSC of the HNB, the measured time difference information between the HNB and the macro cell, the measured location information of the HNB, and the measured signal quality in the corresponding measurement information, and when they are matched with each other, determining that the HNB is a target HNB, and then determining whether the target HNB is the interference source HNB of the terminal according to the register information.

2. The method according to claim 1, wherein the registering the HNB according to the register information comprises one of the following steps:
   step A: registering the HNB according to the path loss from the macro cell to the HNB, the PSC of the HNB, and the quality of the neighbor cell signal received by the HNB;
   step B: registering the HNB according to the PSC of the HNB and the quality of the neighbor cell signal received by the HNB;
   step C: registering the HNB according to the path loss from the macro cell to the HNB and the PSC of the HNB;
   step D: registering the HNB according to the PSC of the HNB and the time difference information between the HNB and the macro cell;
   step E: registering the HNB according to the PSC of the HNB and the location information of the HNB; and
   step F: registering the HNB according to the location information of the HNB.

3. The method according to claim 1, wherein before the receiving the measurement information related to the HNB reported by the terminal, the method further comprises:
   adjusting the transmit power of the HNB when determining, according to the transmit power of the HNB, that the HNB interferes with the macro cell.

4. The method according to claim 1, further comprising:
   receiving from the HNB an update request including updated register information.

5. The method according to claim 1, wherein the determining whether the target HNB is the interference source HNB of the terminal according to the register information comprises:
   determining that the target HNB is the interference source HNB, when it is determined, according to the access mode and the access control list in the register information, that the terminal cannot access the target HNB; or
   determining that the target HNB is the interference source HNB, when it is determined, according to the access mode in the register information, that the target HNB is in a closed mode, the target HNB is not in a neighbor cell list of the macro cell, and the terminal does not support a closed subscriber group (CSG).

6. The method according to claim 1, wherein the performing the power adjustment on the interference source HNB comprises:
   sending to the HNB an air interface signaling including power control information; or,
   sending to the HNB a power adjustment signaling.

7. A method for interference management of a home NodeB (HNB), the method comprising:
   sending a register request including register information to a NodeB controller (NBC);
   receiving from the NBC a register response indicating that the registration is successful;
   accepting a power adjustment made by the NBC when the home NodeB (HNB) is determined to be an interference source HNB and determining, by the NBC, whether the HNB is an interference source HNB according to the register information and measurement information reported by a terminal,
wherein the register information comprises basic information of the HNB and other information;
wherein the basic information comprises at least one of: a primary scrambling code (PSC) of the HNB, a transmit power of the HNB, an access mode, or an access control list;
wherein the other information comprises at least one of: a quality of a macro cell signal received by the HNB, a path loss from the HNB to a macro cell, a quality of a neighbor cell signal received by the HNB, time difference information between the HNB and the macro cell, or location information of the HNB; and
wherein the measurement information comprises at least one of: a measured PSC of the HNB, a measured signal quality, measured time difference information between the HNB and the macro cell, or measured location information of the HNB,
wherein the determining, by the NBC, whether the HNB is an interference source HNB according to the register information and measurement information reported by a terminal comprises:
matching the PSC of the HNB, the time difference information between the HNB and the macro cell, the location information of the HNB, and the quality of the macro cell signal received by the HNB in the register information with corresponding the measured PSC of the HNB, the measured time difference information between the HNB and the macro cell, the measured location information of the HNB, and the measured signal quality in the corresponding measurement information, and when they are matched with each other, determining that the HNB is a target HNB, and then determining whether the target HNB is the interference source HNB of the terminal according to the register information.

8. The method according to claim 7, wherein before the sending the register request to the NBC, the method further comprises one of the following steps:
   step I: selecting an NBC of a common-frequency macro cell having a strongest signal according to a signal strength; and
   step II: selecting an NBC according to a configuration in an HNB Management System (HMS);
   wherein the sending the register request to the NBC of the macro cell comprises:
   sending the register request to the selected NBC.

9. The method according to claim 7, wherein the sending the register request to the NBC comprises one of the following steps:
   step 1: sending the register request to the NBC through an air interface signaling;
   step 2: sending the register request to the NBC through an HNB gateway (HNB-GW) or a core network (CN); and
   step 3: sending the register request to the NBC through a direct interface between the HNB and the NBC.

10. The method according to claim 7, further comprising:
    updating the register information; and
    sending updated register information to the NBC through an update request, so that the NBC updates the register information.

11. The method according to claim 7, wherein the accepting the power adjustment made by the NBC comprises:
receiving from the NBC an air interface signaling including power control information, and adjusting the transmit power according to the air interface signaling; or,
receiving from the NBC a power adjustment signaling, and adjusting the transmit power according to the power adjustment signaling.

12. A NodeB Controller (NBC), comprising:
a receiver configured to receive from a home NodeB (INB) a register request including register information;
a processor configured to register the HNB according to the register information; and
a transmitter configured to transmit to the HNB a register response indicating that the registration is successful;
wherein the receiver is further configured to receive measurement information related to the HNB reported by a terminal;
wherein the processor is further configured to determine an interference source HNB of the terminal according to the register information and the measurement information; and to perform a power adjustment on the interference source HNB,
wherein the register information comprises basic information of the HNB and other information;
wherein the basic information comprises at least one of: a primary scrambling code (PSC) of the HNB, a transmit power of the HNB, an access mode, or an access control list;
wherein the other information comprises at least one of: a quality of a macro cell signal received by the HNB, a path loss from the HNB to a macro cell, a quality of a neighbor cell signal received by the HNB, time difference information between the HNB and the macro cell, or location information of the HNB; and
wherein the measurement information comprises at least one of: a measured PSC of the HNB, a measured signal quality, measured time difference information between the HNB and the macro cell, or the measured location information of the HNB,
wherein the processor is further configured to match the PSC of the HNB, the time difference information between the HNB and the macro cell, the location information of the HNB, and the quality of the macro cell signal received by the HNB in the register information with corresponding the measured PSC of the HNB, the measured signal quality, the measured time difference information between the HNB and the macro cell, and the measured location information of the HNB in the measurement information, and when they are matched with each other, determine that the HNB is a target HNB, and then determine whether the target HNB is the interference source HNB of the terminal according to the register information.

13. The NBC according to claim 12,
wherein the processor is further configured to perform one of:
register the HNB according to the path loss from the macro cell to the HNB, the PSC of the HNB and the quality of the neighbor cell signal received by the HNB;
register the HNB according to the PSC of the HNB and the quality of the neighbor cell signal received by the HNB;
register the HNB according to the path loss from the macro cell to the HNB and the PSC of the HNB;
register the HNB according to the PSC of the HNB and the time difference information between the HNB and the macro cell;
register the HNB according to the PSC of the HNB and the location information of the HNB; and
register the HNB according to the location information of the HNB.

14. The NBC according to claim 12, wherein,
the processor is further configured to adjust the transmit power of the HNB when determining, according to the transmit power of the HNB, that the HNB interferes with the macro cell, before the transmitter transmits to the HNB the register response indicating that the registration is successful.

15. The NBC according to claim 12, wherein the receiver is further configured to receive from the HNB an update request including updated register information;
wherein the processor is further configured to register the HNB according to the updated register information and further configured to determine an interference source HNB of the terminal according to the updated register information and the measurement information.

16. The NBC according to claim 12, wherein,
the processor is further configured to determine whether the target HNB is the interference source HNB of the terminal according to the register information comprises: to determine that the target HNB is the interference source HNB, when it is determined, according to the access mode and the access control list in the register information, that the terminal cannot access the target HNB; or determine that the target HNB is the interference source HNB, when it is determined, according to the access mode in the register information, that the target HNB is in a closed mode, the target HNB is not in a neighbor cell list of the macro cell and the terminal does not support a closed subscriber group (CSG).

17. A Home NodeB (HNB), comprising:
a transmitter configured to send to a NodeB controller (NBC) of a macro cell a register request including register information;
a receiver configured to receive from the NBC a register response indicating that a registration is successful; and
a processor configured to accept a power adjustment made by the NBC when the HNB is determined as an interference source HNB,
wherein the NBC determines whether the HNB is an interference source HNB according to the register information and measurement information reported by a terminal, the register information comprises basic information of the HNB and other information;
wherein the basic information comprises at least one of a primary scrambling code (PSC) of the HNB, a transmit power of the HNB, an access mode, or an access control list;
wherein the other information comprises at least one of: a quality of a macro cell signal received by the HNB, a path loss from the HNB to a macro cell, a quality of a neighbor cell signal received by the HNB, time difference information between the HNB and the macro cell, or location information of the HNB; and
wherein the measurement information comprises at least one of: a measured PSC of the HNB, a measured signal quality, measured time difference information between the HNB and the macro cell, or measured location information of the HNB,
wherein the NBC determining whether the HNB is an interference source HNB according to the register information and measurement information reported by a terminal comprises:

matching the PSC of the HNB, the time difference information between the HNB and the macro cell, the location information of the HNB, and the quality of the macro cell signal received by the HNB in the register information with corresponding the measured PSC of the HNB, the measured time difference information between the HNB and the macro cell, the measured location information of the HNB, and the measured signal quality in the corresponding measurement information, and when they are matched with each other, determining that the HNB is a target HNB, and then determining whether the target HNB is the interference source HNB of the terminal according to the register information.

18. The HNB according to claim 17, wherein,
the processor is further configured to one of:
select an NBC of a macro cell having a strongest signal according to a signal strength, and
select an NBC according to a configuration in an HNB management system (HMS); and
wherein the transmitter is configured to send a register request to the NBC.

19. The HNB according to claim 17, wherein the processor is further configured to update the register information; and
wherein the transmitter is further configured to send the register information to the NBC through an update request, so that the NBC updates the register information.

* * * * *